US012583795B2

(12) United States Patent
Klett et al.

(10) Patent No.: US 12,583,795 B2
(45) Date of Patent: Mar. 24, 2026

(54) SLURRY MIXTURES FOR 3-D SLURRY EXTRUSION OF ARTIFACTS

(71) Applicant: UT-Battelle, LLC, Oak Ridge, TN (US)

(72) Inventors: James W. Klett, Oak Ridge, TN (US); Amelia M. Elliott, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 18/420,010

(22) Filed: Jan. 23, 2024

(65) Prior Publication Data

US 2024/0208870 A1 Jun. 27, 2024

Related U.S. Application Data

(62) Division of application No. 16/832,241, filed on Mar. 27, 2020, now abandoned.

(60) Provisional application No. 62/825,185, filed on Mar. 28, 2019.

(51) Int. Cl.

| | |
|---|---|
| *C04B 35/52* | (2006.01) |
| *B22F 1/10* | (2022.01) |
| *B22F 1/107* | (2022.01) |
| *B22F 10/16* | (2021.01) |
| *B28B 1/00* | (2006.01) |
| *B29C 64/106* | (2017.01) |
| *B33Y 10/00* | (2015.01) |
| *B33Y 40/20* | (2020.01) |
| *B33Y 70/00* | (2020.01) |
| *B33Y 70/10* | (2020.01) |
| *C04B 35/48* | (2006.01) |
| *C04B 35/584* | (2006.01) |
| *C08L 33/00* | (2006.01) |
| *C08L 71/00* | (2006.01) |
| *B29K 1/00* | (2006.01) |
| *B29K 7/00* | (2006.01) |
| *B29K 33/04* | (2006.01) |
| *B29K 83/00* | (2006.01) |
| *B29K 505/12* | (2006.01) |
| *B29K 507/04* | (2006.01) |
| *B29K 509/02* | (2006.01) |
| *B29K 509/04* | (2006.01) |

(52) U.S. Cl.
CPC ............... *C04B 35/52* (2013.01); *B22F 1/10* (2022.01); *B22F 1/107* (2022.01); *B22F 10/16* (2021.01); *B28B 1/001* (2013.01); *B29C 64/106* (2017.08); *B33Y 10/00* (2014.12); *B33Y 40/20* (2020.01); *B33Y 70/00* (2014.12); *B33Y 70/10* (2020.01); *C04B 35/48* (2013.01); *C04B 35/522* (2013.01); *C04B 35/584* (2013.01); *C08L 33/00* (2013.01); *C08L 71/00* (2013.01); *B29K 2001/08* (2013.01); *B29K 2007/00* (2013.01); *B29K 2033/04* (2013.01); *B29K 2083/00* (2013.01); *B29K 2505/12* (2013.01); *B29K 2507/04* (2013.01); *B29K 2509/02* (2013.01); *B29K 2509/04* (2013.01)

(58) Field of Classification Search
CPC ....... C04B 35/52; C04B 35/48; C04B 35/522; C04B 35/584; C04B 2235/422; C04B 2235/5276; C04B 2235/6026; C04B 35/18; C04B 35/622; C04B 35/83; C04B 41/009; C04B 41/51; C04B 41/88; B22F 10/10; B22F 1/10; B22F 1/107; B22F 10/16; B22F 2998/10; B28B 1/001; B29C 64/106; B33Y 10/00; B33Y 40/20; B33Y 70/10; B33Y 70/00; C08L 33/00; C08L 71/00; B29K 2001/08; B29K 2007/00; B29K 2033/04; B29K 2083/00; B29K 2505/12; B29K 2507/04; B29K 2509/02; B29K 2509/04; Y02P 10/25; C22C 1/1036
See application file for complete search history.

(56) References Cited

U.S. PATENT DOCUMENTS

| | | | |
|---|---|---|---|
| 4,837,230 A | 6/1989 | Chen et al. | |
| 2008/0135245 A1* | 6/2008 | Smith | C04B 35/56 |
| | | | 166/280.1 |
| 2016/0168453 A1* | 6/2016 | Florio | C04B 35/622 |
| | | | 507/203 |
| 2016/0317422 A1 | 11/2016 | Szewczyk et al. | |
| 2016/0376199 A1* | 12/2016 | Koep | C04B 35/62813 |
| | | | 507/271 |
| 2017/0327701 A1* | 11/2017 | Connor | B22F 3/1017 |
| 2018/0111881 A1* | 4/2018 | Schubert | C04B 35/638 |
| 2019/0160531 A1* | 5/2019 | Yoo | B22F 1/05 |

(Continued)

FOREIGN PATENT DOCUMENTS

| | | | | |
|---|---|---|---|---|
| CN | 108456457 A | * | 8/2018 | ............. C04B 35/48 |
| GB | 2163780 A | | 3/1986 | |
| WO | 2015087664 A1 | | 6/2015 | |

*Primary Examiner* — Rebecca Janssen
(74) *Attorney, Agent, or Firm* — WARNER NORCROSS + JUDD LLP

(57) ABSTRACT

A slurry composition for forming an article using additive manufacturing is provided. The slurry composition comprises a carrier having a viscosity of at least 0.001 cP at normal temperature and pressure. The carrier is adapted to be flowable through a nozzle. The slurry composition further comprises a material selected from the group of a metal-containing material, a ceramic-containing material, an inorganic carbon-containing material, a silica-containing material, and combinations thereof.

5 Claims, No Drawings

(56)     References Cited

U.S. PATENT DOCUMENTS

| | | | |
|---|---|---|---|
| 2019/0207252 A1* | 7/2019 | Badding | ............. H01M 4/0471 |
| 2021/0238099 A1* | 8/2021 | Canales | ........... C04B 35/62277 |

* cited by examiner

SLURRY MIXTURES FOR 3-D SLURRY EXTRUSION OF ARTIFACTS

CROSS-REFERENCE TO RELATED APPLICATIONS

This application is a divisional of U.S. Application No. 16/832,241, filed Mar. 27, 2020, which claims the benefit of U.S. Provisional Application 62/825,185, filed Mar. 28, 2019, the disclosures of which are incorporated by reference in their entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE DISCLOSURE

The present invention relates to a slurry composition for additive manufacturing, and more particularly to carriers of the slurry compositions.

BACKGROUND OF THE DISCLOSURE

Solid products are commonly shaped from powders in processes such as in metal injection molding and ceramic/clay spinning. Powdered materials have been unable to be shaped efficiently with many forms of additive manufacturing (aka "3D Printing"), such as extrusion, due to the lack of flowability of the powdered materials, such as metal and ceramic powders. The lack of flowability of powders results in the need for bulky additives that not only reduce the packing density of the powder but leave residual materials that negatively impact the composition of the printed article. Recent attempts to extrude powdered materials include the formation of wax sticks comprising the powdered materials. The wax sticks are then extruded through a nozzle to a substrate to form a green part.

However, after formation of the green part, the wax is burned out leaving a low-density article that suffers from shrinkage during firing due to the loss of the wax. Accordingly, there remains a need for an improved slurry composition for additive manufacturing that exhibits sufficient flowability while including a reduced amount of non-powdered material relative to conventional slurries.

SUMMARY OF THE DISCLOSURE

A slurry composition for forming an article using additive manufacturing is provided. The slurry composition comprises a carrier having a viscosity of at least 0.001 cP at normal temperature and pressure. The carrier is adapted to be flowable through a nozzle. The slurry composition further comprises a material selected from the group of a metal-containing material, a ceramic-containing material, an inorganic carbon-containing material, a silica-containing material, and combinations thereof.

These and other features and advantages of the present invention will become apparent from the following description of the invention, when viewed in accordance with the appended claims.

DETAILED DESCRIPTION

A slurry composition for forming an article is provided. The slurry composition is suitable for use with additive manufacturing. In particular, the slurry composition may be applied by slurry extrusion through a nozzle to a substrate to form the article. Application of the slurry composition may be referred to as "printing." The terms "applying" or "printing" may be performed by any suitable apparatus understood in the art of additive manufacturing (AM) and/or three-dimensional (3D) printing. ASTM Designation F2792-12a, which is titled "Standard Terminology for Additive Manufacturing Technologies" and herein incorporated by reference in its entirety, defines additive manufacturing as "a process of joining materials to make objects from 3D model data, usually layer upon layer, as opposed to subtractive manufacturing methodologies," and 3D printing as "the fabrication of objects through the deposition of a material using a print head, nozzle, or another printer technology."

Examples of 3D printers include extrusion additive manufacturing printers, liquid additive manufacturing printers, fused filament fabrications printers, fused deposition modeling printers, direct ink deposition printers, material jet printers, polyjet printers, ink-jetting printers, material jetting printers, syringe extrusion printers, and combinations thereof. Typically, an extrusion-type printer is utilized for applying the slurry composition on the substrate. In various embodiments, the extrusion-type printer comprises the nozzle. The nozzle defines an orifice having a diameter of from about 0.01 to about 10 centimeters.

The substrate that the article is printed on is not limited and may be any substrate. Typically, the substrate is adapted to support the three-dimensional green part during the method of forming. However, the substrate itself may be supported (e.g. by a table or bench), such that the substrate may be a flexible layer or coating (e.g. a release coating, paint, etc.) and need not have inherent rigidity. Likewise, the substrate may be a floor or other surface of a structure, or may be a natural surface (e.g. the ground).

As described above, the slurry composition is suitable for use with additive manufacturing/3D printing. As such, as readily understood in the art of additive manufacturing (AM) and/or three-dimensional (3D) printing, the at least one layer formed by printing the slurry composition is not limiting, as the three-dimensional article may comprise any number of layers. Moreover, a portion of the slurry composition may be printed on a portion of the article.

The slurry composition comprises a carrier and a material with the carrier having a viscosity of at least 0.001 cP at normal temperature and pressure in accordance with ASTM D7867-13. The phrase "normal temperature and pressure" means air at 20° C. and 1 atm. The carrier is adapted to be flowable through the nozzle. The term "flowable" with regard to the nozzle means that the carrier can pass through the orifice of the nozzle. The material is selected from the group of a metal-containing material, a ceramic-containing material, an inorganic carbon-containing material, a silica-containing material, and combinations thereof. The material will be described in detail below. As such, the slurry composition allows for forming articles comprising the material, also referred to herein as "green parts," having complex cross-sections or configurations that would not be possible using conventional methods of forming articles comprising the materials. For example, the composition can be used to form components for carbon artifacts for furnaces, carbon-carbon composites, ceramic parts, metallic components, fibrous insulations for 3-D printed buildings, heat exchangers, catalyst supports for the chemical industry, and the like.

As introduced above, the slurry composition comprises as a carrier. The carrier may have a viscosity of at least 0.001 cP, alternatively at least 1 cP, alternatively at least 100 cP, or alternative at least 200 cP, at normal temperature and pressure in accordance with ASTM D7867-13. The carrier may have a viscosity of no greater than 15,000 cP, alternatively no greater than 7,500 cP, or alternatively no greater than 5,000 cP, at normal temperature and pressure in accordance with ASTM D7867-13. In various embodiments, the carrier is in the form of a liquid or a gel such that the slurry composition is also in the form of a liquid or a gel. In certain embodiments, the slurry composition is not a flowable powder. The carrier may be present in the slurry composition in an amount of from about 0.1 to about 95 wt. %, alternatively from about 0.1 to about 85 wt. %, alternatively from about 0.1 to about 10 wt. %, alternatively from about 1 to about 5 wt. %, or alternatively from about 2 to about 3 wt. %, based on a total weight of the slurry composition. In various embodiments, the slurry composition includes the carrier in an amount of less than 95 volume percent (vol. %), alternatively less than 80 vol. %, or alternatively less than 70 vol. %.

The carrier may comprise a solvent. Examples of suitable solvents include, but are not limited to, water, an inorganic solvent, an organic solvent, or combinations thereof. In certain embodiments, the carrier comprises water. It is be appreciated that carriers comprising water may be suitable for printing materials that are flammable to minimize the occurrence of unintended ignition of the composition. In various embodiments, the carrier comprises water and an organic solvent. Examples of suitable organic solvents include, but are not limited to, ethanol, butanol, propanol, isopropanol, acetone, methyl ethyl ketone, methyl isobutyl ketone, methyl amyl ketone, ethyl acetate, butyl acetate, and combinations thereof. Examples of suitable inorganic solvents include, but are not limited to, ammonia, carbon tetrachloride, carbon disulfide, and combinations thereof.

The carrier may comprise a binder, a thickener, or a combination thereof. With regard to the thickener, in various embodiments, the thickener provides a rheological advantage to thicken the slurry composition such that it flows similar to a liquid rather than similar to wet sand. The thickener may be selected from the group of a gel-based thickener, wax-based thickener, a silicone-based thickener, and combinations thereof. In some embodiments, the gel-based thickener is a sol-gel. With regard to the binder, in certain embodiments, the binder maintains the formation of the material during and after drying of the carrier. The binder may be selected from the group of a gel-based binder, a cellulose-based binder, an acetate-based binder, a silicate-based binder, a carbonate-based binder, a hydroxy-functional binder, a photo-curable binder, and combinations thereof. The hydroxy-functional binder may be selected from the group of a phenolic binder, a furfurol alcohol, a polyethylene glycol, and combinations thereof.

In one exemplary embodiment, the carrier comprises the gel-based thickener, and the gel-based thickener comprises a gum. The gum may be present in the carrier in an amount of from about 0.1 to about 50 wt. %, alternatively from about 0.1 to about 10 wt. %, or alternatively from about 1 to about 5 wt. %, based on a total weight of the carrier. In these and other embodiments, the gel-based thickener further comprises water. The water may be present in an amount of from about 50 to about 99.9 wt. %, alternatively from about 90 to about 99.9 wt. %, or alternatively from about 95 to about 99 wt. %, based on a total weight of the carrier. In these and other embodiments, the gel-based thickener further comprises isopropanol. The isopropanol may be present in an amount of from about 0.1 to about 50 wt. %, alternatively from about 0.1 to about 10 wt. %, or alternatively from about 1 to about 5 wt. %, based on a total weight of the carrier. A non-limiting example of a suitable gel-based thickener is commercially available from WallColmonoy Corp. of Madison Heights, MI under the trade name Nicrobraz, such as Nicrobraz S Binder.

In another exemplary embodiment, the carrier comprises the gel-based thickener, and the gel-based thickener comprises a sol-gel of a hydroxyethyl cellulose. It is to be appreciated that the hydroxyethyl cellulose may also function as the binder. The hydroxyethyl cellulose may be present in the carrier in an amount of from about 0.1 to about 50 wt. %, alternatively from about 0.1 to about 10 wt. %, or alternatively from about 0.5 to about 5 wt. %, based on a total weight of the carrier. In these and other embodiments, the gel-based thickener further comprises water. The water may be present in an amount of from about 25 to about 99.9 wt. %, alternatively from about 25 to about 75 wt. %, or alternatively from about 35 to about 55 wt. %, based on a total weight of the carrier. In these and other embodiments, the gel-based thickener further comprises ethanol. The ethanol may be present in an amount of from about 25 to about 99.9 wt. %, alternatively from about 25 to about 75 wt. %, or alternatively from about 35 to about 55 wt. %, based on a total weight of the carrier.

In another exemplary embodiment, the carrier comprises the gel-based thickener, and the gel-based thickener comprises a sol-gel of a colloidal silica. The colloidal silica may be present in the carrier in an amount of from about 0.1 to about 50 wt. %, alternatively from about 0.1 to about 10 wt. %, or alternatively from about 0.5 to about 5 wt. %, based on a total weight of the carrier. A non-limiting example of a suitable gel-based thickener is commercially available from W. R. Grace & Co .-Conn. of Columbia, MD under the trade name LUDOX.

In another exemplary embodiment, the carrier comprises the gel-based thickener, and the gel-based thickener comprises a sol-gel of a hydroxyethyl cellulose and a phenolic binder. It is to be appreciated that the hydroxyethyl cellulose may also function as the binder. The hydroxyethyl cellulose may be present in the carrier in an amount of from about 0.1 to about 50 wt. %, alternatively from about 0.1 to about 10 wt. %, or alternatively from about 0.5 to about 5 wt. %, based on a total weight of the carrier. The phenolic binder may be present in the carrier in an amount of from about 0.1 to about 50 wt. %, alternatively from about 0.1 to about 10 wt. %, or alternatively from about 0.5 to about 5 wt. %, based on a total weight of the carrier. In these and other embodiments, the gel-based thickener further comprises water. The water may be present in an amount of from about 25 to about 99.9 wt. %, alternatively from about 25 to about 75 wt. %, or alternatively from about 35 to about 55 wt. %, based on a total weight of the carrier. In these and other embodiments, the gel-based thickener further comprises ethanol. The ethanol may be present in an amount of from about 25 to about 99.9 wt. %, alternatively from about 25 to about 75 wt. %, or alternatively from about 35 to about 55 wt. %, based on a total weight of the carrier. A non-limiting example of a suitable phenolic binder is commercially available from SBHPP of Novi, MI under the trade name Durez.

In another exemplary embodiment, the carrier comprises the gel-based thickener, and the gel-based thickener comprises a sol-gel of a hydroxyethyl cellulose and a photo-curable binder. The hydroxyethyl cellulose may be present in the carrier in an amount of from about 0.1 to about 50 wt. %, alternatively from about 0.1 to about 10 wt. %, or alternatively from about 0.5 to about 5 wt. %, based on a total weight of the carrier. The photo-curable binder may be present in the carrier in an amount of from about 0.1 to about 50 wt. %, alternatively from about 0.1 to about 10 wt. %, or alternatively from about 0.5 to about 5 wt. %, based on a total weight of the carrier. In these and other embodiments, the gel-based thickener further comprises water. The water may be present in an amount of from about 25 to about 99.9 wt. %, alternatively from about 25 to about 75 wt. %, or alternatively from about 35 to about 55 wt. %, based on a total weight of the carrier. In these and other embodiments, the gel-based thickener further comprises ethanol. The ethanol may be present in an amount of from about 25 to about 99.9 wt. %, alternatively from about 25 to about 75 wt. %, or alternatively from about 35 to about 55 wt. %, based on a total weight of the carrier.

In another exemplary embodiment, the carrier comprises the wax-based thickener, and the wax-based thickener comprises a polyethylene glycol. The polyethylene glycol may be present in the carrier in an amount of from about 0.1 to 100 wt. %, alternatively from about 0.1 to about 50 wt. %, or alternatively from about 0.5 to about 25 wt. %, based on a total weight of the carrier.

In another exemplary embodiment, the carrier comprises the silicone-based thickener, and the silicone-based thickener comprises a siloxane. Non-limiting examples of suitable siloxanes include polycarbosiloxane, polysiloxane, and the like. The siloxane may be present in the carrier in an amount of from about 0.1 to 100 wt. %, alternatively from about 50 to 100 wt. %, or alternatively from about 75 to 100 wt. %, based on a total weight of the carrier.

In another exemplary embodiment, the carrier comprises the gel-based binder, and the gel-based binder comprises a hydroxyethyl cellulose. It is to be appreciated that the sol-gel of the hydroxyethyl cellulose may also function as the thickener, as described above. The hydroxyethyl cellulose may be present in the carrier in an amount of from about 0.1 to about 50 wt. %, alternatively from about 0.1 to about 10 wt. %, or alternatively from about 0.5 to about 5 wt. %, based on a total weight of the carrier.

In another exemplary embodiment, the carrier comprises the acetate-based binder, and the acetate-based binder comprises sodium acetate. The sodium acetate may be present in the carrier in an amount of from about 0.1 to about 99 wt. %, alternatively from about 0.1 to about 50 wt. %, or alternatively from about 0.5 to about 25 wt. %, based on a total weight of the carrier.

In another exemplary embodiment, the carrier comprises the silicate-based binder, and the silicate-based binder comprises sodium silicate. The sodium silicate may be present in the carrier in an amount of from about 0.1 to about 99 wt. %, alternatively from about 0.1 to about 50 wt. %, or alternatively from about 0.5 to about 25 wt. %, based on a total weight of the carrier.

In another exemplary embodiment, the carrier comprises the carbonate-based binder, and the carbonate-based binder comprises polypropylene carbonate. The polypropylene carbonate may be present in the carrier in an amount of from about 0.1 to about 99 wt. %, alternatively from about 0.1 to about 50 wt. %, or alternatively from about 0.5 to about 25 wt. %, based on a total weight of the carrier. A non-limiting example of a suitable polypropylene carbonate is commercially available from Empower Materials of New Castle, DE under the trade name QPAC, such as QPAC 40.

In another exemplary embodiment, the carrier comprises the hydroxy-functional binder, and the hydroxy-functional binder is selected from the group of a phenolic binder, a furfurol alcohol, a polyethylene glycol, and combinations thereof. The phenolic binder may be present in the carrier in an amount of from about 0.1 to about 99 wt. %, alternatively from about 0.1 to about 50 wt. %, or alternatively from about 0.5 to about 25 wt. %, based on a total weight of the carrier. The furfurol alcohol may be present in the carrier in an amount of from about 0.1 to 100 wt. %, alternatively from about 50 to 100 wt. %, or alternatively from about 75 to 100 wt. %, based on a total weight of the carrier. The polyethylene glycol may be present in the carrier in an amount of from about 0.1 to 100 wt. %, alternatively from about 50 to 100 wt. %, or alternatively from about 75 to 100 wt. %, based on a total weight of the carrier.

In another exemplary embodiment, the carrier comprises the photo-curable binder, and the photo-curable binder comprises a photo-curable acrylic. The hydroxy-functional binder may be present in the carrier in an amount of from about 0.1 to 100 wt. %, alternatively from about 50 to 100 wt. %, or alternatively from about 75 to 100 wt. %, based on a total weight of the carrier.

As introduced above, the material is selected from the group of a metal-containing material, a ceramic-containing material, an inorganic carbon-containing material, a silica-containing material, and combinations thereof. The material may be present in the form of a powder, a fiber, a microbead, or combinations thereof. The material may be present in the slurry composition in an amount of from about 5 to about 55 wt. %, alternatively from about 20 to about 50 wt. %, or alternatively from about 35 to about 45 wt. %, based on a total weight of the slurry composition.

Non-limiting examples of suitable metal-containing materials include metal fibers and stainless steel powders, such as a 420 grade stainless steel powder. Non-limiting examples of suitable ceramic-containing materials include silicon nitride powders, zirconia powders, zeolite powder, silicon carbides, ceramic fibers, and the like. Non-limiting examples of suitable inorganic carbon-containing materials include a graphite microbead, FORTAFIL™ milled carbon fibers, graphite fibers, and the like. The phrase "inorganic carbon-containing material" means that the material is substantially free of carbon-hydrogen bonds. "Substantially free" means that the inorganic carbon-containing material comprises less than 5 mol. %, alternatively less than 1 mol. %, or alternatively less than 0.1 mol. % of carbon-hydrogen bonds. A non-limiting example of a suitable silica-containing material includes glass fiber.

In certain embodiments, the slurry composition further comprises a sintering aid. The sintering aid may be selected from the group of graphene, a nickel-containing sintering aid, a ceramic-containing sintering aid, and combinations thereof. The sintering aid may be present in the slurry composition in an amount of from about 0.1 to about 10 wt. %, alternatively from about 1 to about 5 wt. %, or alternatively from about 2 to about 3 wt. %, based on a total weight of the slurry composition. A non-limiting example of a suitable nickel-containing sintering aid includes nickel powder. Non-limiting examples of suitable ceramic-containing sintering aids include silicon nitride, ceramic whiskers, ceramic additives, and combinations thereof.

A method of forming an article using additive manufacturing is also provided. The method comprises providing the slurry composition and applying the slurry composition to a substrate to form the article, as described above.

The method further comprises densifying the article to form a processed article. Any method of densifying an article may be utilized so long as it is compatible with the material by which the article is formed from.

In one exemplary embodiment, densifying the article comprises combining the article and a polymeric composition to form the processed article. For example, the article may be combined with a preceramic polymer with ceramic additives and whiskers so that shrinkage during firing is minimized thereby reducing the presence of cracks in the processed article.

In another exemplary embodiment, densifying the article comprises exposing the article to heat at a temperature of from about 600° C. to about 2500° C. to form the processed article. It is believed that the binder will burn out during exposure of high heat.

In another exemplary embodiment, densifying the article comprises exposing the article to heat at a temperature of from about 800° C. to about 2000° C. and then combining the article and a molten metal to form the processed article. For example, the article may be backfilled with molten bronze.

In another exemplary embodiment, densifying the article comprises exposing the article to a vacuum and heat at a temperature of from about 400° C. to about 2000° C. in the presence of a precursor to form a deposit on the article

8 then exposing the article to heat at a temperature of from about 600° C. to about 1400° C. to form the processed article. Examples of suitable carbon precursors include, but are not limited to, pitch, phenolics, furfurol alcohols, and combinations thereof.

In another exemplary embodiment, densifying the article comprises exposing the article to irradiation to form the processed article. For example, in embodiments of the slurry composition comprising the photo-curable binder, an ultra violet lamp may be placed near a print bed of the extrusion-type printer such that the slurry composition may cure as it is applied through the nozzle to the substrate. A heating step may be applied to dehydrate the UV cured article to form the processed article. It is to be appreciated that any combination of the aforementioned densifying steps may be utilized.

EXAMPLES

Exemplary Slurry Compositions

Exemplary slurry compositions may be formed comprising various carriers and materials. The exemplary slurry compositions may further include thickeners, binders, solvents, sintering aids, or combinations thereof. The exemplary slurry compositions can be found in Table I below. Values in parenthesis in Table I correspond to an amount of the component in weight percent based on a total weight of the solvent, material, or sintering aid, respectively.

TABLE I

| Slurry | Carrier | | | | |
|---|---|---|---|---|---|
| Comp. | Thickener | Binder | Solvent | Material | Sintering Aid |
| 1 | Gel Thickener I | — | Water/ Isopropanol | Metal Material I | Graphene (1)/ Ceramic Aid I (99) |
| 2 | Gel Thickener II | — | Water (50)/ Ethanol (50) | Metal Material I | Graphene (1)/ Ceramic Aid I (99) |
| 3 | Gel Thickener II | Hydroxy Binder I | Water (50)/ Ethanol (50) | Metal Material I | Graphene (1)/ Ceramic Aid I (99) |
| 4 | Gel Thickener II | — | Water (50)/ Ethanol (50) | Ceramic Material I | Graphene (1)/ Ceramic Aid I (99) |
| 5 | Gel Thickener I | — | Water/ Isopropanol | Ceramic Material II | — |
| 6 | Gel Thickener II | — | Water (50)/ Ethanol (50) | Ceramic Material III | Nickel Aid I |
| 7 | Gel Thickener II | Hydroxy Binder I | Water (50)/ Ethanol (50) | Inorg. Carbon Material I | — |
| 8 | Gel Thickener II | Hydroxy Binder I | Water (50)/ Ethanol (5) | Inorg. Carbon Material I (97.5)/ Inorg. Carbon Material II (2.5) | — |
| 9 | Gel Thickener II | Hydroxy Binder I | Water (50%)/ Ethanol (50) | Inorg. Carbon Material II | — |
| 10 | Gel Thickener II | Hydroxy Binder I | Water (50)/ Ethanol (50) | Inorg. Carbon Material I (35)/ Inorg. Carbon Material III (65) | — |
| 11 | Silicone Thickener I | — | — | Ceramic Material IV | Graphene (1)/ Ceramic Aid II/ Ceramic Aid III |
| 12 | Gel Thickener II | Photo Binder I | Water (50)/ Ethanol (50) | Ceramic Material IV | Graphene (1)/ Ceramic Aid II/ Ceramic Aid III | thereby forming the processed article. In various embodiments, chemical vapor deposition may be utilized. Examples of suitable precursors include, but are not limited to, carbon, ceramic, such as silicone carbide and refractories, metal, such as tungsten, and combinations thereof.

In another exemplary embodiment, densifying the article comprises combining the article and a carbon precursor and Gel Thickener I is a commercially available thickener comprising gum, water, and isopropanol.

Gel Thickener II is a thickener comprising hydroxyethyl cellulose.

Silicone Thickener I is a thickener comprising at least one of polycarbosiloxane and polysiloxane.

Hydroxy Binder I is a commercially available binder comprising a phenolic binder.

Photo Binder I is a binder comprising photo-curable acrylic.

Metal Material I is a commercially available metal comprising 420 grade stainless steel powder.

Ceramic Material I is a ceramic comprising silicon nitride powder.

Ceramic Material II is a ceramic comprising zirconia powder.

Ceramic Material III is a ceramic comprising zeolite powder.

Inorg. Carbon Material I is an inorganic carbon comprising graphite microbeads.

Inorg. Carbon Material II is an inorganic carbon comprising 100 micron FORTAFIL™ milled carbon fibers.

Inorg. Carbon Material III is an inorganic carbon comprising 200 micron FORTAFIL™ milled carbon fibers.

Ceramic Aid I is a sintering aid comprising a silicon nitride.

Ceramic Aid II is a sintering aid comprising ceramic whiskers.

Ceramic Aid III is a sintering aid comprising ceramic additives.

Nickel Aid I is a sintering aid comprising a nickel powder.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

What is claimed is:

1. A method of forming an article using additive manufacturing, the method comprising:

providing a slurry composition comprising:

less than 70 vol. % of a carrier having a viscosity of at least 0.001 cP at normal temperature and pressure, wherein the carrier is adapted to be flowable through a nozzle, the carrier consisting of a sol-gel of a hydroxyethyl cellulose in an amount of from 0.1 to 10 wt. % based on the total weight of the carrier, a phenolic binder in an amount of from 0.1 to 10 wt. % based on the total weight of the carrier, and the balance a solvent that is a 50/50 mixture of water and ethanol; and 5 to 55 wt. % of a material that is an inorganic carbon-containing material consisting of a mixture of graphite microbeads and milled carbon fibers; and applying the slurry composition to a substrate to form the article.

2. The method of claim 1, further comprising densifying the article to form a processed article.

3. The method of claim 2, wherein densifying the article comprises:

(A) combining the article and a polymeric composition to form the processed article;

(B) exposing the article to heat at a temperature of from about 600° C. to about 2500° C. to form the processed article;

(C) exposing the article to heat at a temperature of from about 800° C. to about 2000° C. and then combining the article and a molten metal to form the processed article;

(D) exposing the article to a vacuum and heat at a temperature of from about 400° C. to about 2000° C. in the presence of a precursor to form a deposit on the article thereby forming the processed article;

(E) combining the article and a carbon precursor and then exposing the article to heat at a temperature of from about 600° C. to about 1400° C. to form the processed article;

(F) exposing the article to irradiation to form the processed article; or (G) any combination of (A) to (F).

4. The method of claim 1, wherein the slurry composition further comprises a sintering aid.

5. The method of claim 4, wherein the sintering aid is selected from the group of graphene, a nickel-containing sintering aid, a ceramic-containing sintering aid, and combinations thereof.

*  *  *  *  *